United States Patent [19]
Gobby

[11] 3,834,721
[45] Sept. 10, 1974

[54] TWIN CHAIN DRIVE FOR TRICYCLES

[76] Inventor: Alan B. Gobby, 6645 N. 58th Ave., Glendale, Ariz. 85301

[22] Filed: Nov. 29, 1973

[21] Appl. No.: 419,981

[52] U.S. Cl............... 280/7.15, 280/236, 280/261
[51] Int. Cl............................................. B62m 9/00
[58] Field of Search................ 280/7.15, 236, 261; 180/72, 27

[56] References Cited
UNITED STATES PATENTS

| | | | |
|---|---|---|---|
| 1,348,568 | 8/1920 | Kemble | 180/27 X |
| 3,094,187 | 6/1963 | Horowitz | 180/27 |
| 3,190,676 | 6/1965 | Junge | 180/27 X |
| 3,229,988 | 1/1966 | Mansperger | 280/7.15 |
| 3,258,273 | 6/1966 | Matthews | 280/7.15 |
| 3,368,823 | 2/1968 | Templeton | 280/7.15 |
| 3,466,059 | 9/1969 | Kiernan | 280/7.15 X |
| 3,713,502 | 1/1973 | Delaney et al. | 180/27 |

*Primary Examiner*—Kenneth H. Betts
*Attorney, Agent, or Firm*—Warren F. B. Lindsley

[57] ABSTRACT

A twin chain drive mechanism for the propulsion of a pair of separated, aligned axle shafts and their attached rear road wheels of a tricycle at various speeds by the manipulation of its pedals, each independent axle shaft having a free-wheeling drive sprocket removably attached thereto which allows for coasting and the variable speeds of the wheels required during operation.

8 Claims, 3 Drawing Figures

3,834,721

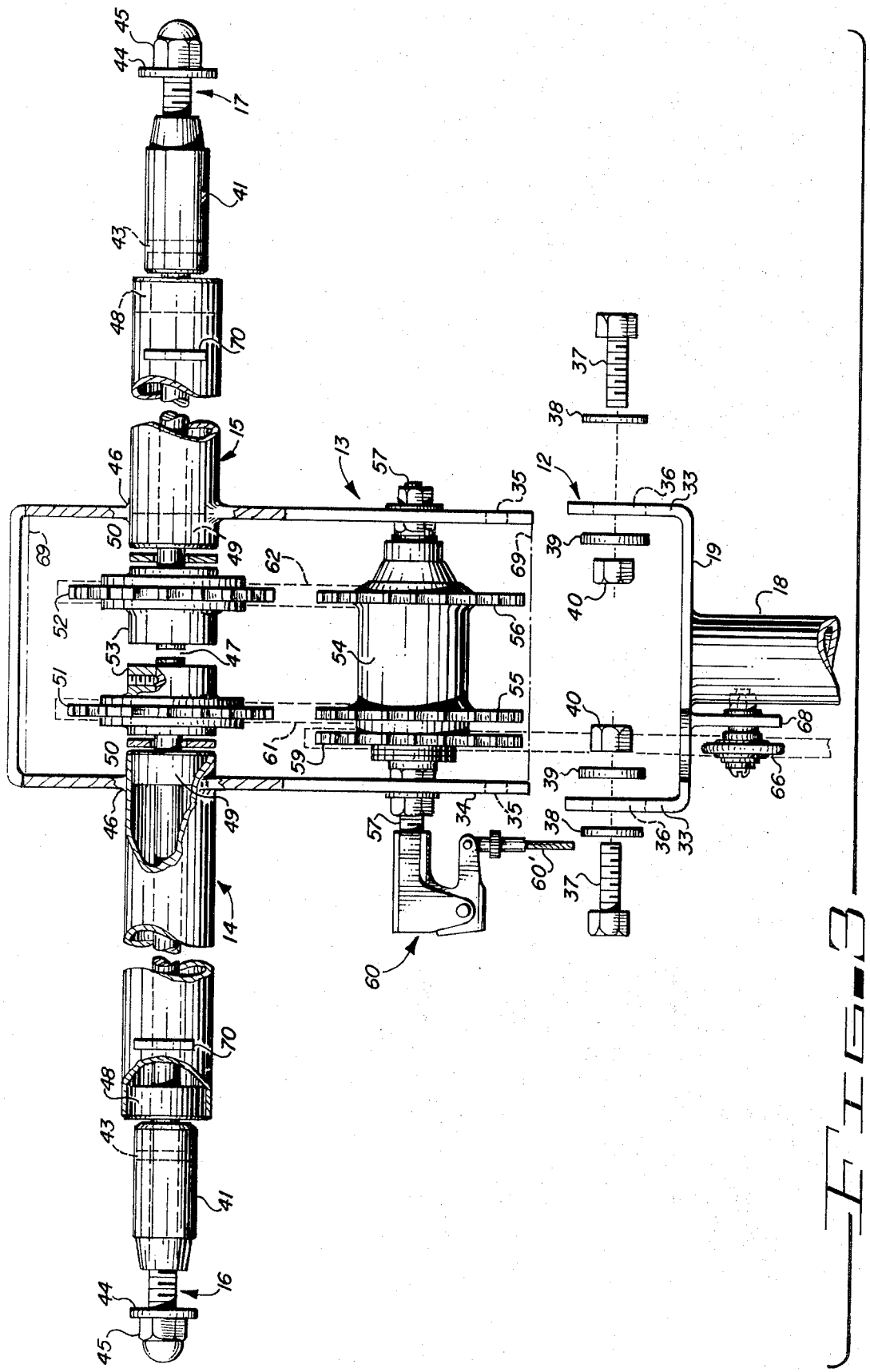

TWIN CHAIN DRIVE FOR TRICYCLES

BACKGROUND OF THE INVENTION

This invention is directed to tricycles and more particularly to improvements in the drive train or mechanism utilized for propelling such devices.

FIELD OF THE INVENTION

This invention is particularly directed to the type of three-wheeled vehicle or tricycle which is commonly used by residents of retirement communities for exercise and shopping purposes. Such tricycles are usually provided with a demountable wire basket mounted between the rear wheels directly behind the tricycle seat for transporting various items resulting from the shopping trip.

DESCRIPTION OF THE PRIOR ART

Heretofore, adult tricycles have been provided with a conventional single-chain driving mechanism peopelling only one of the pair of axially aligned rear road wheels. The other of this pair of wheels rotates freely about an independent axially aligned shaft. The inherent disadvantages of such a driving mechanism include excessive wear of the tire on the driving wheel, lack of traction of one wheel, especially when the tricycle is being ridden on rough or wet road surfaces, and the tendency of one of the tires to skid as the tricycle turns corners due to the lack of a speed differential between the inside and outside rear wheels of the tricycle.

SUMMARY OF THE INVENTION

In accordance with the invention claimed, an improved tricycle is provided with a new and improved twin chain drive means for propelling the tricycle by the application of equal and simultaneous thrust forces to each of its rear wheels.

It is therefore the principle object of this invention to provide a twin chain drive means or transmission which may be applied to a conventional tricycle and utilized to provide equalized traction and selective propulsion forces simultaneously on each of its rear road wheels.

Another object of this invention is to provide a twin chain drive or transmission for tricycles which, when associated with the tricycle frame and actuated through the usual single drive chain, sprocket and foot pedal arrangement by the operator, is capable of providing forward propulsion of the tricycle at selective speeds with the least physical effort.

Still another object of this invention is to provide a twin chain drive or transmission for tricycles which is capable of allowing effortless coasting of the vehicle when desired, and speed variation between the inside and outside rear road wheels when the vehicle is turning corners.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawing, in which:

FIG. 3 is a top plan view of the twin chain drive or transmission assembly shown in FIG. 2 installed in the rear portion of the supporting frame of the tricycle, and with the forward portion of the supporting frame and its attaching components shown in exploded relationship to illustrate one method of attaching this portion of the frame to the rearwardly projecting bar of the tricycle frame and with the twin drive chains and main sprocket drive chain indicated in dash lines.

DESCRIPTION OF THE PREFERRED EMBODIMENT

Figure 1:
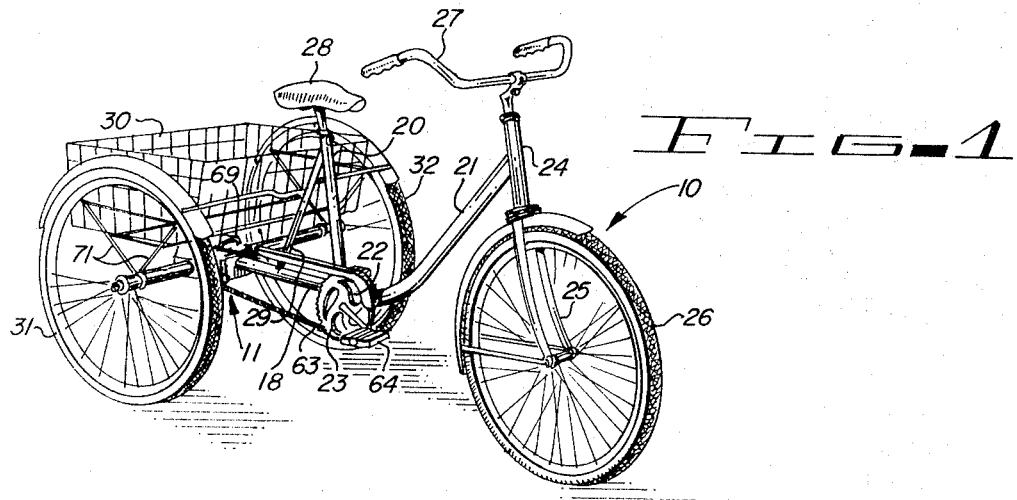
FIG. 1 is a perspective view of a tricycle having a twin chain drive or transmission incorporating the features of this invention.

Referring more particularly to the drawings by characters of reference, FIG. 1 illustrates a tricycle 10 having a twin chain drive or transmission assembly 11 incorporated thereon.

The front end portion of a conventional bicycle or tricycle is utilized in conjunction with front and rear U-shaped frame members 12 and 13. Integral transversely extending rear axle housings 14 and 15 are rigidly secured on the sides of frame member 13 and are adapted to support in rotative relationship the separate, right and left wheel supporting axle shafts 16 and 17 therein. The rearwardly extending tubular frame member 18 is rigidly secured to the front face 19 of U-shaped frame member 12 with its forward end rigidly secured to the sprocket housing of the conventional front end portion of the tricycle.

The front end portion of the tricycle preferably comprises the usual V-shaped frame structure of a conventional two-wheel ladies' type bicycle which consists of the rear upwardly and angularly extending tubular frame member 20 and the front upwardly and angularly extending tubular frame member 21 both welded at their lower ends to the cylindrical sprocket crank housing 22 in which the pedal crank and large drive sprocket wheel 23 is journaled. The rearwardly extending tubular frame member 18 is welded at its front end to the crank housing 22 and modified at its rear end by the elimination of its rear wheel supporting fork portion and welded or otherwise secured to the front face 19 of the U-shaped frame member 12 as previously described.

The front end frame portion of the conventional two-wheel bicycle utilized to provide the frame structure of tricycle 10 includes the usual steering column 24 which is welded to the upper end of the front angular frame member 21. The shank of a steering fork 25 is journaled in steering column 24 at one end. At its other end the hub and axle of the front steerable road wheel 26 is secured. In the top end thereof the shank of handlebars 27 is received and connected thereto in the usual manner.

The rear, upwardly and angularly extending tubular frame member 20 is adapted to receive at its top end the shank of the usual adjustable driver's seat 28. A frame reinforcing member 29 may be welded at its upper end to frame member 20 and and at its lower end to the horizontal, rearwardly extending frame member 18 and used to partially support a demountable wire basket or container 30 between the rear road wheels 31 and 32 of the tricycle, as shown in FIG. 1.

To complete the assembly of the tricycle frame, the rigid rear portion thereof in which the twin chain drive or transmission of this invention is installed is connected in rigid relationship to the front portion of the frame by aligning the front U-shaped frame member 12 in horizontal and longitudinal relationship so that the rearwardly extending legs 33 of frame member 12 overlap in juxtapositioned relationship the sides of the forwardly extending legs 34 of the rear U-shaped frame member 13. This arrangement transversely aligns a pair of clearance holes 35 in frame member 13 with a pair of horizontally elongated clearance holes 36 in the frame member 12, through which aligned holes bolts 37 are inserted. These bolts with spacer washers 38 are tightened and secured on the inside surfaces of the legs 34 of the frame member 13 by means of suitable lock-washers and nuts 39 and 40, thus providing a longitudinally adjustable relationship between the front and rear portions of the rigid tricycle frame.

The hubs of the rear road wheels 31 and 32 are fixed in demountable relationship on bushings 41 and 42. These bushings in turn are fixed to the outer ends of the separate rotatable right and left axially aligned axle shafts 16 and 17 in spaced relationship by means of set screws 43. Set screws 43 are threaded into the bushings and through the axle shafts, thereby providing for forced rotation of the road wheels through their respective bushings 41 and 42 when the hubs of said wheels are fixed thereon by means of washers and nuts 44 and 45 threaded onto the outer ends of the separate axle shafts 16 and 17.

The rear axle housings 14 and 15 are preferably fabricated of thick-walled tubing of the same length and inside diameter and are arranged to extend inwardly of the tricycle through circular, transversely aligned openings in the forwardly extending legs 34 of the rear U-shaped frame member 13 an equal distance and welded at points 46. In this position, they are exactly perpendicular to the longitudinal center-line of frame members 12 and 13 and the rearwardly extending frame member 18. Thus, the rear axle housings become an integral part of the rear U-shaped frame member 13.

The rotatable wheel supporting axle shafts 16 and 17 extend inwardly through the axle housings 14 and 15 and project beyond the inner ends of the opposed housings an equal distance sufficient to allow a clearance space 47 between their opposed juxtaposed ends. These shafts are journaled at one end in suitable bearings 48 secured in the outer ends of each axle housing and in bearings 49 at their other ends secured in the inner ends of these housings. A pair of spacer washers 50 are positioned on the inner ends of the opposed axle shafts between the inner ends of the axle housings and the outer hub faces of a pair of identical, free-wheeling sprockets 51 and 52 which are secured in fixed relationship a predetermined distance inwardly of the respective inner ends of axle shafts 16 and 17 by set screws 53. Set screws 53 are threaded into the inwardly facing hub portions of the free-wheeling sprockets, as shown in FIG. 3. The outer hub faces of the fixed sprockets 51 and 52 and the spacer washers 50 serve to limit the lateral movement of the wheel supporting axle shafts 16 and 17.

A multi-speed hub 54 having an integral pair of spaced sprocket wheels 55 and 56, preferably of the same size as the free-wheeling sprockets 51 and 52, is mounted on a shaft 57 on frame 13 directly in front of and in exact parallel relationship with its transverse center-line. Suitable lock-washers and nuts secure shaft 57 against the sides of legs 34 of the rear frame member 13.

It should be understood that the multi-speed hub 54 is similar in construction to known multiple speed hubs equipped to provide a bicycle or tricycle with a plurality of manually controlled speeds by the association of the usual small drive sprocket 59 with hub 54. A suitable speed selector mechanism 60 is actuated by an operator through means of a bowden-wire cable 60' or a similar device and a lever (not shown) on the handlebars 27 of the tricycle. In this disclosure the set speed of the small drive sprocket 59 also determines the speed of the multi-speed hub 54 and hence the speed of the rear road wheels 31 and 32 driven through the free-wheeling sprocket 51 and 52, drive chains 61 and 62, and sprocket wheels 55 and 56.

The small drive sprocket 59 is driven in the usual manner by means of the main drive chain 63 which is connected to the large sprocket wheel 23 of the crank housing 22. Thus, drive sprocket 59 drives all of the rotatable components of the twin chain driven and the rear road wheels 31 and 32 when the large main sprocket is rotated by the operator actuating the usual foot pedals 64.

Figure 2:
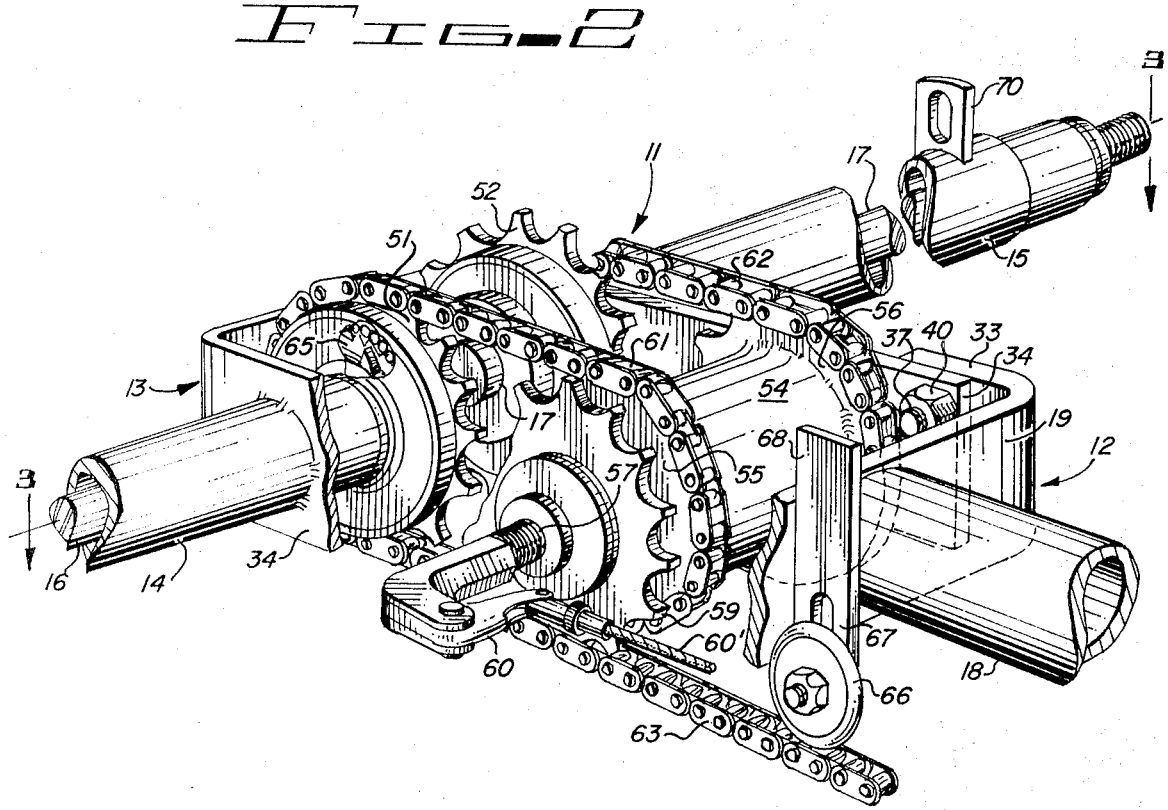
FIG. 2 is a fragmentary perspective view of the twin chain drive or transmission assembly of this invention showing the same with its supporting components attached to the rearwardly projecting bar of the tricycle's frame.

The free-wheeling sprockets 51 and 52 are of the usual construction employing a ratchet device employing the usual ratchet wheel and pawl, as shown in FIG. 2. Such an arrangement provides for simultaneous, forced rotation of the separate axle shafts 16 and 17 and the associated rear road wheels 31 and 32 fixed thereto when the main large sprocket wheel 23 is rotated as described above. This arrangement provides for independent rotation of either of the axles and their associated road wheels when the speed of the axles and road wheels is greater than the driven speed of the same. For example, when the tricycle is coasting down a hill with the operator holding his foot on pedals 63 in a stationary position, or when the rotational speed of one of the road wheels is greater than the other, as for example when the tricycle is being driven around corners, or when there may be a speed differential betwen the road wheels when the tricycle is traversing loose or slippery surfaces, the free wheeling sprockets 51 and 52 provide for this function.

In order to keep the main drive chain 63 taut at all times, a rubber or other soft outer surfaced roller 66 is mounted on the frame of the tricycle. This roller is mounted on bracket 68 in a pivoted and adjusted relation in an elongated vertical clearance hole 67 in bracket 68. Bracket 68 is welded or otherwise secured to the front face 19 of the U-shaped, front frame member 12 and allowed to bear against the inside surface of the chain in rotative relationship therewith. The wheel base of the tricycle also may be changed or adjusted to compensate for the use of a shorter or longer main drive chain 63 by increasing or decreasing the distance between the front and rear frame members 12 and 13 by loosening bolts 37 and moving the frame members farther apart or closer together with the bolts still in the clearance holes 35 and the elongated holes 36 in the respective frame members and again tightening the bolts to secure the frame members in rigid relationship to each other.

A removable cover plate 69 (shown in FIG. 1 and indicated by dot-dash lines in FIG. 3) may be attached to the upper top edges of the legs 34 of the rear U-shaped frame member 13 to protect the revolving components of the twin chain drive from damage and to prevent any possible injury to the feet or hands of the operator of the tricycle. The upper surfaces of the separate rear axle housings 14 and 15 are provided with upstanding lugs 70 which are welded or otherwise secured thereto and provided with cleaance holes through which bolts may be inserted to support the bottom ends of triangular-shaped support members 71. These members are attached to and utilized to firmly support the wire basket or container 30 at both of its ends.

It should be noted that although no braking system has been shown or described in the drawings or the preceding paragraphs of this specification, it is evident that the well known caliper type braking system which is remotely operated by actuating levers attached to the handlebars and used extensively on two-wheeled bicycles could be installed. The caliper brake units may be applied to any two or all three wheels of the twin chain driven tricycle of this invention.

Although but one embodiment of the invention has been shown and described, it will be apparent to those skilled in the art that various changes and modifications may be made therein without departing from the spirit of the invention or from the scope of the appended claims.

What is claimed is:

1. A converter unit adopted for use in converting a conventional bicycle to a tricycle, said unit comprising:

rigid axle housing means having a pair of spaced axles supported for rotation therewithin in axial alignment, each of said axles having a first end projecting from opposite ends of said axle housing means, means for securing in driving arrangement wheel means to each of said first ends of said pair of spaced axles, said axle housing means including rigid bracket means projecting outwardly from the middle portion thereof, power transmission means supported by said rigid bracket means with the axis thereof spaced from and parallel to said rigid axle housing and having a plurality of sprocket means thereon, a driven, free-wheeling sprocket secured to the other ends of each of said pair of spaced axles, chain drive means separately interconnecting each of said driven free-wheeling sprockets with a different one of said sprocket means on said power transmission means, means for connecting a further one of said sprocket means on said power transmission means to a crank mechanism of a bicycle, and means for connecting said rigid bracket means to the rear end of a bicycle frame in lieu of the rear wheel and hub assembly.

2. The converter unit set forth in claim 1 wherein:
said free-wheeling sprocket comprises a ratchet mechanism embodying a ratchet wheel and pawl arrangement.

3. The converter unit set forth in claim 2 in further combination with:
an idler roller adjustably mounted on said axle housing means for applying tension to said means for connecting said sprocket means to said power transmission means.

4. The converter unit set forth in claim 1 wherein:
said spaced axles provide a clearance space between their juxtapositioned ends, and
said free-wheeling sprockets are spaced inwardly of said juxtapositioned ends a predetermined distance.

5. A tricycle comprising:
a frame,
a front wheel steering fork and handlebar assembly rotatably connected to the front of said frame,
a rear axle assembly fixed to the rear end of said frame,
said rear axle assembly comprising a left-hand tubular member having its inner end fixed to the rear end of said frame, a right hand tubular member in axial alignment with and axially spaced from the left hand tubular member forming a sprocket slot between the inner ends thereof, and a strut fixed to each tubular member to maintain their alignment, a drive shaft journaled in each of said right and left hand tubular members,
a free-wheeling sprocket fixed to the inner ends of each drive shaft for freeing an associated wheel mounted on each drive shaft from the sprocket under predetermined conditions,
a pedal crank on said frame having a sprocket fixed thereto,
a transmission means mounted on said frame between said pedal crank and said sprocket space comprising a driven sprocket and a pair of spaced driving sprockets,
a first drive chain interconnecting said sprocket on said pedal crank with said driven sprocket of said transmission means, and
second and third drive chains each interconnecting a different one of said drive sprockets of said transmission means with a different one of said free-wheeling sprockets.

6. The tricycle set forth in claim 5 wherein:
said free-wheeling sprocket comprises a ratchet mechanism embodying a ratchet wheel and pawl arrangement.

7. The tricycle set forth in claim 6 in further combination with:
an idler roller adjustably mounted on said frame for applying tension to said first drive chain.

8. The tricycle set forth in claim 5 wherein:
the drive shafts journaled in said right and left hand tubular members are in axial aligned and spaced relationship and spaced from each other at their juxtapositioned ends a predetermined distance, and
the free-wheeling sprockets are spaced inwardly at said justapositioned ends a predetermined distance.

* * * * *